July 21, 1964 A. H. BOBECK 3,142,045
ELECTRICAL INFORMATION HANDLING CIRCUIT
Original Filed Aug. 4, 1958
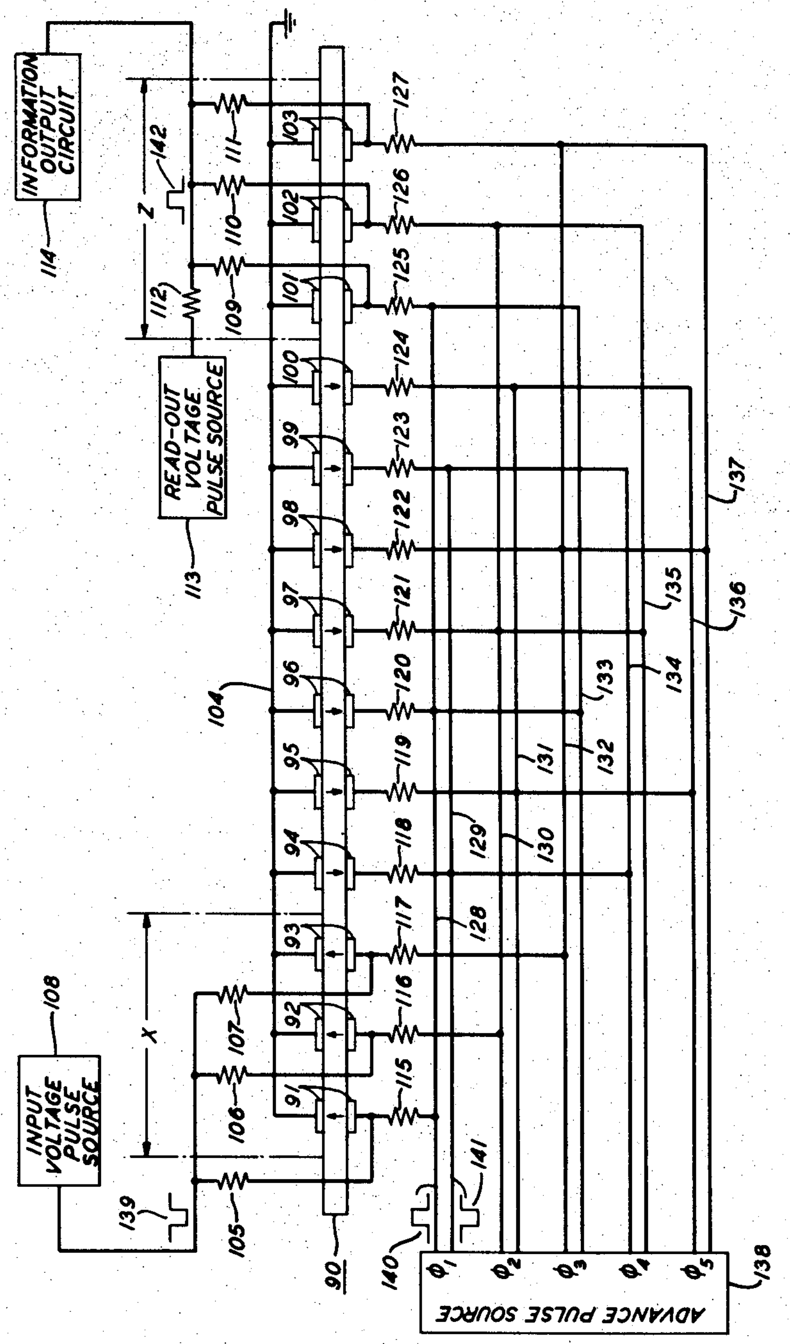
INVENTOR
A. H. BOBECK
BY William H. Kamstra
ATTORNEY 3,142,045
Patented July 21, 1964

3,142,045

ELECTRICAL INFORMATION HANDLING CIRCUIT

Andrew H. Bobeck, Chatham, N.J., assignor to Bell Telephone Laboratories, Incorporated, New York, N.Y., a corporation of New York Original application Aug. 4, 1958, Ser. No. 752,905, now Patent No. 3,090,946, dated May 2, 1963. Divided and this application Nov. 28, 1962, Ser. No. 240,617
7 Claims. (Cl. 340—173.2)

This invention relates to electrical information handling circuits, and more particularly to binary electrical delay lines and shift registers. This application is a division of the copending application of A. H. Bobeck Serial No. 752,905, filed August 4, 1958, now Patent No. 3,090,946 issued May 2, 1963.

Electrical information handling circuits employing individual memory elements of a material having substantially nonlinear characteristics whereby the memory elements are enabled to remain in either of two stable states are well known. Such circuits are extensively represented in the art in various and numerous forms and may advantageously employ memory elements of either a ferromagnetic or a ferroelectric material. Ferroelectric materials of the character contemplated herein display charge-voltage characteristics represented by curves which are substantially rectangular. These characteristics are manifested in the advantageous ability of the ferroelectrics to remain in either of two conditions of electric charge induced therein by an applied electromotive force. This two-state property of these materials obviously renders memory elements composed thereof highly useful for storing binary information bits.

One well-known information handling circuit in which ferroelectric memory elements may be employed is a shift register circuit. In such a circuit binary information may be introduced at one point and temporarily stored or delayed by shifting it along successive information addresses to another point in the circuit. Such a shift register circuit employing ferromagnetic cores as individual memory elements is described, for example, in the "Proceedings of the IRE," April 1951, at page 401 by An Wang. In that shift register circuit and in others employing other two-state devices as individual memory elements, unilateral conducting elements, such as diodes, are frequently necessary circuit components. Thus, for example, diodes are employed to perform an isolation function of blocking backward transfer of information between stages of the register during the activating phase of operation. Wherever it has been necessary to introduce diodes in known shift register circuits for any reason, disadvantages in terms of added cost, higher power requirements, and reliability have been encountered. In view of these and other considerations it becomes highly advantageous to reduce to a minimum or even eliminate the necessity for such diodes.

Shift register arrangements in the prior art employing ferromagnetic memory elements, such as conventional magnetic toroidal cores, for information storage in each stage, in addition to requiring the assistance of diodes, also present the usual less favorable considerations incident to the use of such memory elements. Thus, for example, in the fabrication of toroidal magnetic core circuits the winding and threading of the cores with the conductors which control and sense the magnetic states may prove costly and time consuming. This very winding and threading may also constitute a limiting factor when it becomes advantageous to reduce the size of the magnetic memory element to its absolute minimum dimensions.

Accordingly, it is an object of this invention to temporarily store and delay binary information in a new and novel manner without the necessity of employing unilateral conducting elements in the operation.

It is also an object of this invention to provide an improved shift register arrangement employing a ferroelectric element as a unitary information storage means.

A further object of this invention is the storage of binary information in a new and novel memory cell.

The foregoing and other objects are realized according to the principles of this invention in a single memory structure incorporating therein a plurality of information cells or addresses. The memory structure is understood to be divided into a plurality of individually polarizable discrete segments, having an interaction therebetween, with a predetermined number of such segments making up each of the information addresses. Initially the segments of each of the addresses are polarized in the same direction. An information bit such as a binary "1," for example, is introduced into a first address of the memory structure by reversing all of the segments of that address to the opposite direction, in which direction the address group of segments remains for permanent storage of the "1" information bit.

According to aspects of this invention the memory structure may advantageously comprise a ferroelectric element having a substantially rectangular charge-voltage characteristic curve. The polarization of each discrete segment of such a ferroelectric element is that of an electric charge between plates of the element at each segment point. Obviously, an embodiment of the principles of this invention may include other basic memory structures in which discrete segments or elements therein may be individually polarized.

The information bit is shifted along the ferroelectric memory element by simultaneously restoring the first segment of the instant address to its initial polarization and reversing the polarization of the next segment following the last segment of the instant address. A new alignment of segments thus results and the information address has in this manner been shifted one segment position. As an information bit is shifted along the memory element in successive phases of operation, the bit obviously occupies a succession of overlapping bit addresses. When the last address position of the memory element is reached, the information bit may be read out by simultaneously applying a reversing excitation to each of the individual segments of that address. If a binary "1," for example, has been shifted to that position, each of the segments in the last address will be restored to the initial polarization and this reversal of polarization may be detected as a readout signal.

The foregoing and other objects and features of this invention will be clearly understood from a consideration of the detailed description thereof which follows when taken in conjunction with the accompanying drawing, the single figure of which depicts an illustrative ferroelectric embodiment of this invention.

A shift register arrangement embodying the principles of this invention is shown in the drawing and employs as a single memory element 90 a ferroelectric slab which is capable of maintaining a charge after the removal of an inducing voltage applied to opposing plates. The element 90, when provided with suitable electrodes or plates, comprises a nonlinear multiple capacitor having a dielectric of a material which displays a substantially rectangular charge-voltage characteristic curve. Such materials are well known in the art and will maintain a charge of one or the other polarities unless a reversing voltage of sufficient magnitude is applied. It is known, however, that in such materials a minimum length of a charged region exists below which the charge will be influenced by interactions from adjacent charged regions. Thus, any region below this length will be unstable and cannot be relied upon to maintain its charge. Any length over this minimum length as, for example, two such regions both of which are under this minimum length, on the other hand, will exhibit the nonlinear property described above.

The ferroelectric element 90 is divided into a plurality of separately chargeable capacitor segments, the length of each of which is less than that of one of the minimal stable regions described above, by a plurality of pairs of plates 91 through 103. Groups of the segments thus defined make up a plurality of overlapping information addresses on the memory element 90. Thus, for example, the segments defined by the pairs of plates 91, 92, and 93 make up the first information address designated as X. One plate of each of the pairs of plates 91 through 103 is connected to a ground bus 104 and the other plate of each pair of plates is connected in an information shift network in the manner to be described hereinafter. The latter plates of the plate pairs 91, 92, and 93 of the first information address X are parallelly connected respectively through resistors 105, 106, and 107 to an input voltage pulse source 108. The latter source may be any suitable source well known in the art capable of providing voltage pulses of the polarity and magnitude required to charge simultaneously the information address X segments.

The ungrounded plates of the plate pairs 101, 102, and 103 defining the segments of the last information address Z are parallelly connected respectively through resistors 109, 110, and 111 and a series resistor 112 to a read-out voltage pulse source 113. The latter source may also comprise any suitable voltage source well known in the art capable of providing read-out voltage pulses of the character and at the time to be described hereinafter. Connected between the resistor 112 and the parallel resistors 109, 110, and 111 is an information output circuit 114. The ungrounded plates of each of the plate pairs 91 through 103 are connected respectively through a plurality of isolating resistors 115 through 127 to a five phase shift or advance network by means of which shift voltage pulses are sequentially applied to the plates to effect the shift of information along the register. Shift potentials of opposing polarities are simultaneously applied to the address segments in each shift circuit in order to advance an information bit segment by segment along the register. Accordingly, each of the advance circuits comprises dual circuit means to carry the opposing voltage shift pulses. Thus, the $\varphi_1$ shift circuit comprises the conductor pairs 128 and 129; the $\varphi_2$ shift circuit comprises the conductor pairs 130 and 131; the $\varphi_3$ shift circuit comprises the conductor pairs 132 and 133; the $\varphi_4$ shift circuit comprises the conductor pairs 134 and 135; and the last, $\varphi_5$ shift circuit comprises the conductor pairs 136 and 137. The conductor pairs are interconnected between the ungrounded plates of the plate pairs 91 through 103 and an advance voltage pulse source 138 in the manner following. Conductor 128 is parallelly connected through resistors 115, 120, and 125 to the ungrounded plates of the plate pairs 91, 96, and 101, respectively. Conductor 129 is parallelly connected through resistors 118 and 123 to the ungrounded plates of the plate pairs 94 and 99, respectively. Conductor 130 is connected through the parallel resistors 116, 121, and 126 to the ungrounded plates of the plate pairs 92, 97, and 102, respectively. Conductor 131 is connected through the parallel resistors 119 and 124 to the ungrounded plates of the plate pairs 95 and 100, respectively.

The interconnections of the conductor pairs of the shift network are continued with the connection of the conductor 132 through the parallel resistors 117, 122, and 127 to the ungrounded plates of the plate pairs 93, 98, and 103, respectively. The conductor 133 is connected to each of the ungrounded plates of the plate pairs 96 and 101 through the parallel resistors 120 and 125, respectively. The conductor 134 is parallelly connected to the ungrounded plates of the plate pairs 94 and 99 through the resistors 118 and 123, respectively, and the conductor 135 is parallelly connected to the ungrounded plates of the plate pairs 97 and 102 through the resistors 121 and 126, respectively. Finally, the conductor pairs 136 and 137 are connected to the ungrounded plates of the plate pairs 95 and 100, and 98 and 103, respectively, through the respective parallel resistors 119 and 124, and 122 and 127. The pulse source 138 may advantageously comprise any suitable sequential switching means capable of providing a sequence of substantially simultaneous pairs of oppositely poled voltage pulses of a magnitude sufficient to reverse the charge condition of the particular ferroelectric material comprising the memory element 90.

The operation of the ferroelectric embodiment of this invention is dependent upon the fact of polarity reversal in the individual address segments rather than upon the particular direction in which the reversal takes place. Accordingly, in keeping with the directions of the charges between the plate pairs 91 through 103, the address capacitor segments defined by these plate pairs may be understood as normally charged transversely downward as viewed in the drawing. That is, in accordance with the polarity of the energizing voltage pulses to be described, the grounded plates of the plate pairs are normally negatively charged and the opposite plates are normally positively charged. These charges are symbolized by downwardly directed arrows in the drawing between the plate pairs 94 through 100. During the input phase of operation, an information bit such as a binary "1" may be introduced by the application of a negative input voltage pulse 139 from the source 108. This voltage pulse is applied across the parallel isolating resistors 105, 106, and 107 to the ungrounded plates of the plate pairs 91, 92, and 93, respectively. The capacitor segments defined by the latter plate pairs making up the address X will each be reversed from its normal direction of charge and assume a charge as symbolized by the upwardly directed arrows in the drawing, to represent the "1" binary value.

This bit may now be shifted along the memory element 90 in the succeeding advance phase of operation. This advance phase comprises the application of a plurality of pairs of oppositely poled sequential advance or shift voltage pulses to the dual shift circuits $\varphi_1$ through $\varphi_5$. A positive advance voltage pulse 140 is first applied to the conductor 128 of the $\varphi_1$ circuit substantially simultaneously with the application of a negative advance voltage pulse 141 to the conductor 129 of the same circuit. The oppositely poled pulses 140 and 141 are applied to the plate pairs 91 and 94 through the isolating resistors 115 and 118, respectively. As a result, the charge in the capacitor segment defined by the plate pair 91 is reversed to its normal polarity and the charge in the segment defined by the plate pair 94 is reversed from its normal polarity. The intermediate capacitor segments defined by the plate pairs 92 and 93 will be electrostatically unaffected due to the inherent stability of the material of the element 90. As was previously mentioned, this stability advantageously permits the isolation of at least two adjacent segments having a charge of opposite polarity to that of the other discrete segments of the element 90.

As a result of the application of the $\varphi_1$ shift voltage pulses 140 and 141, the binary "1," initially contained in the address X, is shifted one capacitor segment to the right as viewed in the drawing. The latter shift voltage pulses are also applied respectively to the plate pairs 96 and 101, and to the plate pair 99. In the case of the plate pairs 96 and 101, the segments defined therebetween are already in a charge state to which the voltage pulse 140 tends to place it so these segments will be unaffected. The capacitor segment defined by the plate pair 99 is an unstable single segment and, although it will be reversed in polarity by the voltage pulse 141, it will be restored by the electrostatic interaction of its adjacent segments upon the termination of the voltage pulse 141 without further external excitation.

As oppositely poled shift voltage pulses are sequentially applied simultaneously to the conductor pairs of the dual shift circuit $\varphi_1$ through $\varphi_5$ in repeated cycles of operation, the information bit "1" is advanced segment by segment through the overlapping information addresses in the manner described for the first segment shift. Ultimately the information bit—here a binary "1"—will be advanced to the last information address Z of the register. At this time the advance pulse source 138 may be interrupted and the character of the information bit presently contained in the address Z determined. A positive read-out voltage pulse 142 is applied from the source 113 across the serial isolating resistor 112 and parallel resistors 109, 110, and 111 to the ungrounded plates of the plate pairs 101, 102, and 103 respectively. The charge of each of the capacitor segments making up the last information address Z defined by the latter plate pairs will be reversed to its normal polarity since in the operation being described a binary "1" was advanced to this last address. The fact of the simultaneous reversal of charges in the capacitor segments of the last address may be detected as a potential drop across the resistor 112 which signal may be detected by the information output circuit 114 and transmitted thereby to associated utilization circuitry, not shown.

Should a binary "0" have been present in the information address Z, in which case each of the segments of that address would have remained in its normal charge state, only a negligible charge change would have taken place in those segments as a result of the application of the positive voltage pulse 142 and only a negligible output signal would have been detected by the output circuit 114. Such a negligible output signal may readily be distinguished from the signal representing a binary "1" by circuitry well known in the art. A complete traversal of an information bit from one end of the shift register of this invention to the other has thus been described.

What has been described is considered to be only an illustrative embodiment of this invention and it is to be understood that various and numerous other arrangements may be devised by one skilled in the art without departing from its spirit and scope.

What is claimed is:

1. A shift register circuit comprising a slab of ferroelectric material having substantially rectangular charge-voltage characteristics, segments of said slab being electrostatically unstable when polarized in lengths less than a minimum dimension as determined by the electrostatic interactions of the remainder of said slab and said segments, a plurality of pairs of electrodes on opposite sides of said slab, said electrode pairs determining a plurality of capacitor segments each being less than said minimum dimension and having said ferroelectric material as a dielectric, a plurality of information address groups each comprising a predetermined number of adjacent said capacitor segments each being normally polarized in one direction, each of said address groups being greater than said minimum dimension, and means for introducing a binary information value into a first address group comprising means for switching the polarization of each of the capacitor segments of said first group to a polarization in the other direction.

2. A shift register circuit as claimed in claim 1 also comprising means for shifting said information value to a second address group comprising first shift means for applying a voltage pulse to the electrodes of one end capacitor segment of said first group to switch the polarization of said last-mentioned segment to said normal one direction, and second shift means for applying a voltage pulse to the electrodes of the segment adjacent the other end segment of said first group to switch the polarization of said last-mentioned capacitor segment to said other direction.

3. A shift register circuit as claimed in claim 1 also comprising means for shifting said information value to succeeding address groups of said slab comprising first shift means for sequentially applying voltage pulses to the electrodes of the one end capacitor segments of each of said plurality of address groups to sequentially switch the polarization of said last-mentioned segments to said normal one direction, and second shift means for sequentially applying voltage pulses to the electrodes of the next segments following the other end segments of each of said plurality of address groups to sequentially switch the normal polarization of said next capacitor segments following the other end capacitor segments.

4. A shift register circuit as claimed in claim 3 also comprising means for simultaneously switching the polarization of the capacitor segments of a third address group from said other direction to said normal one direction and means for detecting said simultaneous polarization switching.

5. An electrical circuit comprising a slab of ferroelectric material having substantially rectangular charge-voltage characteristics, segments of said slab being electrostatically unstable when polarized in lengths less than a minimum dimension as determined by the electrostatic interactions of the remainder of said slab and said segments, a plurality of pairs of electrodes on opposite sides of said slab, said electrode pairs determining a plurality of capacitor segments each being less than said minimum dimension and having said ferroelectric material as a dielectric, said capacitor segments being normally polarized in one direction, means for switching the polarization of a group of at least two adjacent ones of said capacitor segments to the other direction, and means for extending said group comprising means for applying switching voltage pulses to the electrodes of successive additional segments adjacent the last segments of said group to switch the polarization of said successive additional segments to said other direction.

6. An electrical circuit as claimed in claim 5 also comprising means for shifting said group comprising means for applying switching voltage pulses to the electrodes of successive first capacitor segments of said group to restore the polarization of said successive first segments to said one direction substantially simultaneously with said switching of the polarization of said successive additional capacitor segments to said other direction.

7. An electrical circuit as claimed in claim 5 also comprising means for simultaneously switching the polarization to said normal one direction of at least two predetermined adjacent capacitor segments of said group, and means for detecting said simultaneous polarization switching.

References Cited in the file of this patent

UNITED STATES PATENTS 2,717,372 Anderson -------------- Sept. 6, 1955